(12) United States Patent
Besier et al.

(10) Patent No.: US 11,001,243 B2
(45) Date of Patent: May 11, 2021

(54) METHOD FOR OPERATING A BRAKE SYSTEM FOR MOTOR VEHICLES, AND BRAKE SYSTEM

(71) Applicant: Continental Teves AG & Co. oHG, Frankfurt (DE)

(72) Inventors: Marco Besier, Bad Schwalbach (DE); Georg Roll, Frankfurt (DE)

(73) Assignee: Continental Teves AG & Co. oHG

( * ) Notice: Subject to any disclaimer, the term of this patent is extended or adjusted under 35 U.S.C. 154(b) by 238 days.

(21) Appl. No.: 16/070,386

(22) PCT Filed: Feb. 13, 2017

(86) PCT No.: PCT/EP2017/053109
§ 371 (c)(1),
(2) Date: Jul. 16, 2018

(87) PCT Pub. No.: WO2017/144294
PCT Pub. Date: Aug. 31, 2017

(65) Prior Publication Data
US 2019/0031162 A1  Jan. 31, 2019

(30) Foreign Application Priority Data

Feb. 23, 2016 (DE) ...................... 10 2016 202 715.8

(51) Int. Cl.
*B60T 8/176* (2006.01)
*B60T 8/26* (2006.01)
(Continued)

(52) U.S. Cl.
CPC ................ *B60T 8/267* (2013.01); *B60T 7/12* (2013.01); *B60T 8/176* (2013.01); *B60T 8/1766* (2013.01);
(Continued)

(58) Field of Classification Search
CPC combination set(s) only.
See application file for complete search history.

(56) References Cited

U.S. PATENT DOCUMENTS 8,532,902 B2   9/2013  Bentner et al.
9,145,114 B2*  9/2015  Bajorat .................. B60T 7/042
(Continued)

FOREIGN PATENT DOCUMENTS

CN   101484341 A   7/2009
CN   102164792 A   8/2011
(Continued)

OTHER PUBLICATIONS

German Search Report for German Application No. 10 2016 202 715.8, dated Nov. 17, 2016, with partial translation—9 pages.
(Continued)

*Primary Examiner* — Donald J Wallace
*Assistant Examiner* — Daniel M. Robert
(74) *Attorney, Agent, or Firm* — RatnerPrestia

(57) ABSTRACT

Method for operating a brake system of a motor vehicle having a hydraulic service brake device with hydraulically actuated wheel brakes on at least one front axle of the motor vehicle, and a parking brake device with wheel brakes, which can be actuated in each case by an electromechanical actuator, on a rear axle of the motor vehicle, wherein a motor vehicle actual longitudinal deceleration is measured, wherein during a braking operation by the hydraulic service brake device a braking operation is carried out by the parking brake device while the motor vehicle is traveling,
(Continued)

wherein a motor vehicle setpoint longitudinal deceleration which is to be achieved is determined, and the electromechanical actuators of the parking brake device are actuated in such a way that the motor vehicle actual longitudinal deceleration is adjusted to the motor vehicle setpoint longitudinal deceleration.

12 Claims, 1 Drawing Sheet

(51) Int. Cl.
*B60T 8/1766* (2006.01)
*B60T 7/12* (2006.01)
*B60T 13/58* (2006.01)
*B60T 8/32* (2006.01)
*B60T 13/74* (2006.01)

(52) U.S. Cl.
CPC .............. *B60T 8/32* (2013.01); *B60T 8/3255* (2013.01); *B60T 13/588* (2013.01); *B60T 13/74* (2013.01); *B60T 13/746* (2013.01); *B60T 8/326* (2013.01); *B60T 2201/16* (2013.01); *B60T 2230/02* (2013.01); *B60T 2250/00* (2013.01); *B60T 2250/03* (2013.01); *B60T 2270/30* (2013.01); *B60T 2270/402* (2013.01); *B60T 2270/403* (2013.01); *B60T 2270/82* (2013.01)

(56) References Cited

U.S. PATENT DOCUMENTS

| | | | |
|---|---|---|---|
| 2004/0135432 A1* | 7/2004 | Reuter | B60T 13/581 |
| | | | 303/152 |
| 2005/0140207 A1* | 6/2005 | Goebels | B60T 8/17616 |
| | | | 303/140 |
| 2007/0069577 A1* | 3/2007 | Nakaura | B60T 8/4275 |
| | | | 303/155 |
| 2009/0302673 A1 | 12/2009 | Linhoff | |
| 2011/0168502 A1 | 7/2011 | Linhoff et al. | |
| 2013/0253793 A1 | 9/2013 | Lee et al. | |
| 2014/0015310 A1* | 1/2014 | Hanzawa | B60T 17/22 |
| | | | 303/3 |
| 2015/0019101 A1 | 1/2015 | Bajorat | |
| 2017/0174194 A1* | 6/2017 | Baumgaertner | B60T 7/22 |
| 2020/0172064 A1* | 6/2020 | Yasui | B60T 7/042 |

FOREIGN PATENT DOCUMENTS

| | | |
|---|---|---|
| DE | 102007056417 A1 | 6/2009 |
| DE | 102012212329 A1 | 4/2014 |
| WO | 2007090823 A1 | 8/2007 |
| WO | 2015113679 A1 | 8/2015 |

OTHER PUBLICATIONS

International Search Report and Written Opinion for International Application No. PCT/EP2017/053109, dated May 3, 2017—8 pages.
Korean Office Action for Korean Application No. 10-2018-7023141, dated Jul. 4, 2019, with translation, 12 pages.

* cited by examiner

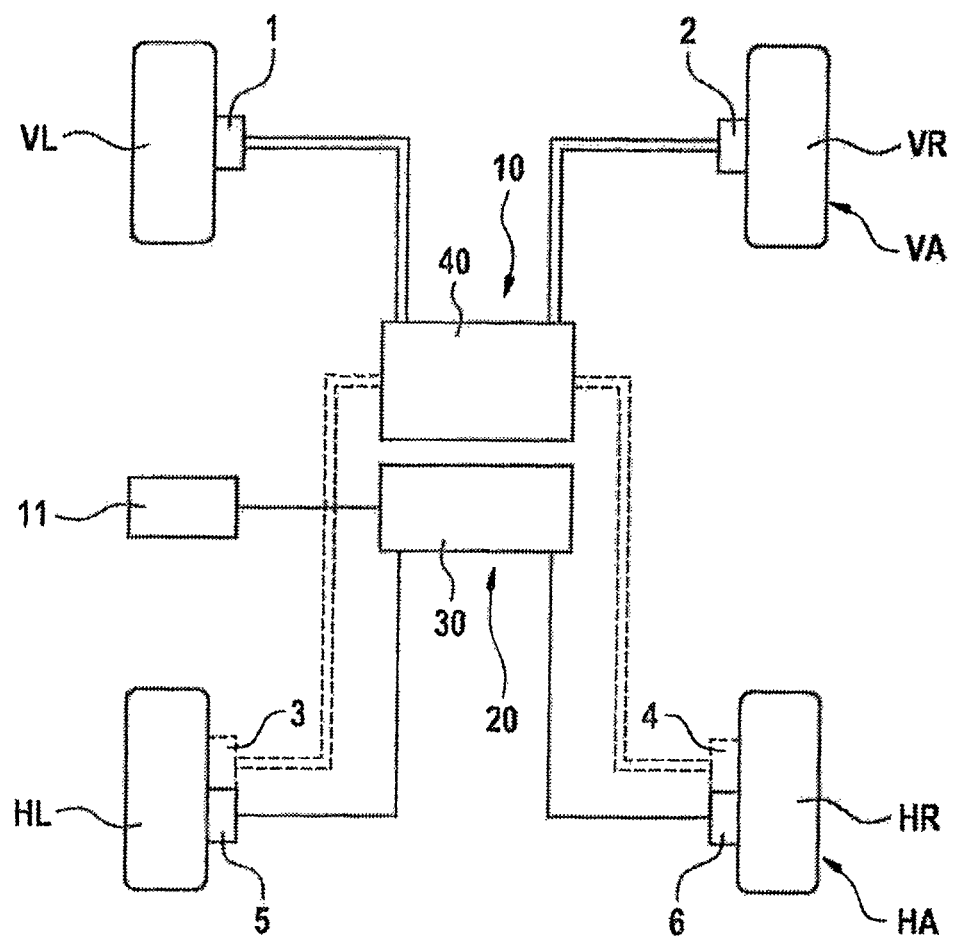

METHOD FOR OPERATING A BRAKE SYSTEM FOR MOTOR VEHICLES, AND BRAKE SYSTEM

CROSS REFERENCE TO RELATED APPLICATIONS

This application is the U.S. National Phase Application of PCT/EP2017/053109, filed Feb. 13, 2017, which claims priority to German Patent Application No. 10 2016 202 715.8, filed Feb. 23, 2016, the contents of such applications being incorporated by reference herein.

FIELD OF THE INVENTION

The invention relates to a method for operating a brake system and to a brake system.

BACKGROUND OF THE INVENTION

Motor vehicles are known which comprise a hydraulic service brake system for front axle and rear axle and a parking brake system which can be activated by the driver by means of an EPB operator control switch and comprise electromechanical parking brakes (EPB) at the wheels of the rear axle. An emergency braking function which, when the EPB operator control switch is activated by the driver during travel, cause a hydraulic braking operation to be triggered by means of the service brake system in order to brake the vehicle with a preset deceleration, is also known in such brake systems. This function is also known as a dynamic braking function (DBF). If the (hydraulic) dynamic braking function (DBF) is not available, the actuator dynamic braking function (ADBF) can be used, as a fallback level, in which the electric parking brakes (EPBs) are used at the rear axle for a braking operation during travel. In this known operating method, the front axle rolls freely, i.e. is unbraked, and the rear axle is braked with the electric parking brakes. The known ADBF is merely activated or deactivated digitally by the driver actuating the EPB operator control switch, i.e. there is no provision for the brake application forces to be made available in a way which can be metered in an analog fashion. In the case of a corresponding operator control command, the electric drives of the electromechanical parking brakes are energized in the brake application direction until a tendency of the EPB-braked wheels to lock can be detected. The energization is then reversed until the tendency to lock is no longer present, in order then to apply the brakes again and to repeat this process cyclically. The rear wheels are therefore braked by means of the electric parking brakes at their stability limit, i.e. with the maximum achievable deceleration effect. This method is accordingly based on control algorithms which react to the slip of the EPB-braked wheels. In this context, the slip is determined by virtue of the fact that the current measured wheel rotational speed is compared with a reference rotational speed which is proportional to the vehicle speed (referred to as the (vehicle) reference speed). The known ADBF uses (only) the measured wheel rotational speed information of the front wheels to form the vehicle reference speed, since said front wheels roll freely during the breaking with ADBF and therefore do not have any slip themselves.

SUMMARY OF THE INVENTION

An aspect of the present invention is a method for operating a brake system as mentioned at the beginning for motor vehicles and a brake system of this kind, which method or brake system increases the safety during braking operations of the motor vehicle, in particular in cases in which the hydraulic service brake device has partially failed or can only be operated in an e.g. non-boosted, hydraulic fallback level operating mode, without using measured wheel rotational speeds of the wheels.

A further aspect of the present invention is a method for operating a brake system and a brake system, which gives rise to an improved braking effect and at the same time maintains, in particular, the vehicle stability.

An aspect of the invention is based on a brake system of a motor vehicle having a hydraulic service brake device with hydraulically actuated wheel brakes on at least one front axle of the motor vehicle, and having a parking brake device with wheel brakes, which can be actuated in each case by an electromechanical actuator, on a rear axle of the motor vehicle. An aspect of the invention is based on the concept that during a braking operation by means of the hydraulic service brake device a braking operation is carried out by means of the parking brake device while the motor vehicle is traveling. Therefore, during travel a braking operation is carried out by means of the parking brake device at the wheels of the rear axle chronologically in parallel with a braking operation at at least the wheels of the front axle by means of the hydraulic service brake device. In this context, an actual longitudinal deceleration of the motor vehicle (referred to as the motor vehicle actual longitudinal deceleration) is measured, a setpoint longitudinal deceleration of the motor vehicle which is to be achieved (referred to as the motor vehicle setpoint longitudinal deceleration) is determined, and the electromechanical actuators of the parking brake device are actuated in such a way that the measured motor vehicle actual longitudinal deceleration is adjusted to the acquired motor vehicle setpoint longitudinal deceleration. As a result, an improved braking effect is achieved without the wheel rotational speeds of the wheels being required.

The motor vehicle setpoint longitudinal deceleration is preferably determined on the basis of a brake pressure of the service brake device. This particularly preferably involves a wheel brake pressure of the hydraulically actuated wheel brakes of the service brake device. The braking effect of the service brake device, in particular at the front axle, is therefore taken sufficiently into account for the braking operation by means of the parking brake device at the rear axle. The motor vehicle setpoint deceleration is particularly preferably additionally determined on the basis of a measured lateral acceleration of the motor vehicle. It is therefore possible to take into account cornering in order to maintain stable lateral guidance of the rear axle even when cornering.

According to one development of an aspect of the invention, the motor vehicle setpoint longitudinal deceleration is calculated from a first motor vehicle longitudinal deceleration portion and a second motor vehicle longitudinal deceleration portion. The first motor vehicle longitudinal deceleration portion advantageously specifies the portion of the front axle on the motor vehicle longitudinal deceleration, and the second motor vehicle longitudinal deceleration portion specifies the portion of the rear axle on the motor vehicle longitudinal deceleration. The motor vehicle setpoint longitudinal deceleration is advantageously simply calculated by addition from the first motor vehicle longitudinal deceleration portion and the second motor vehicle longitudinal deceleration portion.

The first motor vehicle longitudinal deceleration portion is preferably determined from a wheel brake pressure of the hydraulically actuated wheel brakes of the service brake device. The first motor vehicle longitudinal deceleration portion is particularly preferably calculated from the wheel brake pressure on the basis of a first predefined relationship. The first predefined relationship is advantageously simply predefined by a first characteristic curve which is stored e.g. in an electronic open-loop and closed-loop control unit of the brake system. The first motor vehicle longitudinal deceleration portion can therefore be calculated directly from the wheel brake pressure by means of the first predefined relationship.

In the case of unregulated braking operations, the wheel brake pressure in the two wheel brakes of the front axle is the same and corresponds to the (system) brake pressure which is made available by a pressure supply apparatus of the hydraulic service brake device.

The second motor vehicle longitudinal deceleration portion is preferably determined as a function of a measured lateral acceleration of the motor vehicle. It is therefore possible to take into account cornering in order to maintain stable lateral guidance of the rear axle even when cornering.

The second motor vehicle longitudinal deceleration portion is preferably calculated from a third motor vehicle longitudinal deceleration portion and a predefined or predetermined safety deceleration value. The second motor vehicle longitudinal deceleration portion is advantageously obtained from the third motor vehicle longitudinal deceleration portion by subtraction of the safety deceleration value.

In order to easily take into account cornering, the safety deceleration value is preferably predefined as a function of the measured lateral acceleration of the motor vehicle, or the safety deceleration value is preferably determined as a function of the measured lateral acceleration of the motor vehicle. In the latter case, the safety deceleration value is advantageously determined from the measured lateral acceleration on the basis of a third predefined relationship.

The third motor vehicle longitudinal deceleration portion is preferably acquired from the first motor vehicle longitudinal deceleration portion on the basis of a second predefined relationship. The braking effect of the service brake device is therefore taken into account for the dimensioning of the braking effect of the parking brake device at the rear axle. The second predefined relationship is advantageously simply predefined by a second characteristic curve or characteristic diagram which is stored e.g. in an electronic open-loop and closed-loop control unit of the brake system. The second predefined relationship advantageously takes into account a dynamic axle load distribution of the motor vehicle. Inter alia, the vehicle geometry and the center of gravity of the specific motor vehicle are included here. The third motor vehicle longitudinal deceleration portion therefore constitutes a maximum permissible deceleration portion of the rear axle, in order to brake the motor vehicle as quickly as possible without a loss of stability.

In order to avoid locking of the wheels, (front and/or rear wheels) according to one preferred embodiment of an aspect of the invention a time profile or a change in the motor vehicle actual longitudinal deceleration over time and the time profile or a change in the wheel brake pressure of the hydraulically actuated wheel brakes of the front axle over time are observed. On the basis of the observation, locking of at least one of the wheels can be inferred. In particular, a reduction in or plateauing of the motor vehicle actual longitudinal deceleration are to be detected. Measurement variables or motor vehicle actual longitudinal deceleration measured values which are filtered to differing degrees are particularly preferably used for observing the motor vehicle actual longitudinal deceleration. Since a relatively strong filtering also results in a relatively large time offset of the signal, this provides the possibility that in the case of a reduction in the motor vehicle actual longitudinal deceleration an intersection point is produced between a strong signal and a less strongly filtered signal. On the basis of this intersection point between the signals and the observation of the signal profile it is possible to infer that at this moment or shortly before the front wheels have begun to lock or an excessively large slip has started.

On the basis of the observation of the specified variables, locking of at least one of the wheels can be detected. A reduction in pressure is preferably then carried out at the wheel brakes of the service brake device. The reduction in pressure is carried out here similar to as is customary in the case of an ABS control, with the objective of ensuring that the wheels return to a stable slip range, and therefore, on the one hand, can output more longitudinal force again and furthermore can also transmit lateral guidance force again. Higher deceleration can therefore be achieved and the vehicle continues to be steerable.

In order to monitor the stability, a change in the side slip angle of the motor vehicle is preferably determined on the basis of a lateral acceleration of the motor vehicle, a yaw rate of the motor vehicle and a vehicle speed. If the determined change in the side slip angle exceeds a limiting value, the brake application force at the electromechanical actuators of the parking brake device is reduced. Alternatively, the motor vehicle setpoint longitudinal deceleration, or specifically the second motor vehicle longitudinal deceleration portion, is reduced.

The method according to an aspect of the invention is preferably carried out during automated driving.

The method according invention is preferably carried out if breaking by means of a primary braking system of the hydraulic service brake device is not possible and the braking operation is carried out by means of a secondary braking system of the hydraulic service brake device at at least the front axle. The primary braking system of the hydraulic service brake device particularly preferably comprises an electrically actuated, first pressure supply apparatus with which the hydraulically actuated wheel brakes of the front and rear axles can be actuated. The secondary braking system of the hydraulic service brake device particularly preferably comprises an electrically actuated, second pressure supply apparatus with which at least the hydraulically actuated wheel brakes of the front axle can be actuated.

According to one preferred embodiment of the method according to an aspect of the invention, brake force generation which is analog and stepless when averaged over time is carried out at the rear axle using the electric parking brake actuators.

An aspect of the invention also provides the advantage that the method can be carried out with electric parking brakes or electromechanical actuators of a parking brake device which are known per se and which do not usually have a sensor system (such as force, travel or angle sensors), since the actuation of the parking brake device is carried out on the basis of the measured motor vehicle longitudinal deceleration and, if appropriate, a brake pressure of the hydraulic service brake device, said brake pressure being usually determined in any case in brake systems.

An aspect of the invention also relates to a brake system for a motor vehicle having a hydraulic service brake device with hydraulically actuated wheel brakes on at least one front axle, a parking brake device with wheel brakes, which can each be actuated by an electromechanical actuator, at a rear axle, and an electronic open-loop and closed-loop control unit, wherein a method according to an aspect of the invention is carried out in the electronic open-loop and closed-loop control unit. The brake system comprises an acceleration detection device which detects at least a longitudinal deceleration of the motor vehicle or receives measurement data from such an acceleration detection device. For this purpose, the brake system can be connected to the acceleration detection device, or can receive the measurement data thereof via a bus system, e.g. from another control unit.

The brake system is preferably one which can be actuated in a brake-by-wire operating mode either by the vehicle driver as well as independently of the vehicle driver, and can be operated only by the vehicle driver in a hydraulic fallback operating mode.

The acceleration detection device also preferably detects a lateral acceleration of the motor vehicle, or the brake system comprises a further acceleration detection device which detects a lateral acceleration of the motor vehicle or is connected to such a further acceleration detection device.

The hydraulic service brake device of the brake system preferably comprises a primary braking system and a secondary braking system. The primary braking system of the hydraulic service brake device particularly preferably comprises an electrically actuated, first pressure supply apparatus with which the hydraulically actuated wheel brakes of the front and rear axles can be actuated. The secondary braking system of the hydraulic service brake device particularly preferably comprises an electrically actuated, second pressure supply apparatus with which at least the hydraulically actuated wheel brakes of the front axle can be actuated.

BRIEF DESCRIPTION OF THE DRAWINGS

Further preferred embodiments of aspects of the invention can be found in the claims and the following description with reference to a FIGURE.

The FIGURE shows an exemplary brake system for the execution of a method according to the invention.

DETAILED DESCRIPTION OF THE PREFERRED EMBODIMENTS

The FIGURE illustrates an exemplary brake system of a motor vehicle for carrying out a method according to an aspect of the invention in a highly schematic form. The motor vehicle comprises a front axle VA with a left-hand front wheel VL and a right-hand front wheel VR and a rear axle HA with a left-hand rear wheel HL and a right-hand rear wheel HR. The brake system comprises a hydraulic service brake device 10 and an electric parking brake device 20.

The service brake device 10 comprises hydraulically actuated wheel brakes at least for the front axle VA. According to the example, a hydraulically actuated wheel brake 1 is provided for the left-hand front wheel VL, and a hydraulically actuated wheel brake 2 is provided for the right-hand front wheel VR. A hydraulically actuated wheel brake 3 can optionally be provided for the left-hand rear wheel HL, and a hydraulically actuated wheel brake 4 for the right-hand rear wheel HR, which is indicated by the dashed connections. The service brake device 10 also comprises a hydraulic open-loop and closed-loop control unit 40 which can comprise e.g. a brake-pedal-actuated master brake cylinder, an electrically controllable pressure source for a brake-by-wire operating mode, a simulation apparatus which interacts with the master brake cylinder in order to generate a brake pedal sensation in the brake-by-wire operating mode, and electrically actuated valves, e.g. pressure regulating valves for setting wheel brake pressures at the wheel brakes 1-4.

The parking brake device 20 comprises electrically actuated wheel brakes for the rear axle HA. According to the example, a wheel brake 5 is provided for the left-hand rear wheel HL, and a wheel brake 6 is provided for the right-hand rear wheel HR. Each of the electrically actuated wheel brakes comprises an electromechanical actuator (not illustrated in more detail) by which it is actuated.

The wheel brakes 5, 6 of the parking brake device 20 can also be combined with the hydraulic wheel brakes 3, 4 of the rear axle of the service brake device in one unit, e.g. what is referred to as an electromechanically driven combination brake caliper. Electric parking brakes (EPBs) which act on the service brake in order to generate a suitable braking effect, particularly for the parking brake function, are known per se. In the case of an electromechanically driven combination brake caliper, a rotational-translational gear mechanism, (e.g. a spindle drive or ball screw drive) which applies an axial force to the brake piston in the brake caliper, is driven, for example, by means of an electric motor via a primary gear mechanism (usually a rotational-rotational gear mechanism). With this force acting on the brake piston, the brake linings of the brake caliper are pressed against the brake disk and therefore generate a clamping force.

Furthermore, the brake system comprises an electronic open-loop and closed-loop control unit 30. This serves to actuate the electrically actuated components of the hydraulic service brake device 10 and of the parking brake device 20.

An acceleration detection device 11 is provided which measures, for example, the longitudinal deceleration (or longitudinal acceleration) $a_{Fzg,ist}$ and the lateral acceleration $a_{Quer,ist}$ of the motor vehicle. For example, the acceleration detection device 11 is connected to the electronic open-loop and closed-loop control unit 30, with the result that the measurement data a $a_{Fzg,ist}$, $a_{Quer,ist}$ of the acceleration detection device are made available to the electronic open-loop and closed-loop control unit 30 and can be evaluated in order to carry out a method according to an aspect of the invention.

For example, during travel of the motor vehicle a braking operation is carried out by means of the parking brake device 20 at the rear axle chronologically in parallel with a braking operation by means of the hydraulic service brake device 10 at at least the front axle VA. For this purpose, a motor vehicle longitudinal deceleration (referred to as the motor vehicle setpoint longitudinal deceleration) $a_{Fzg,soll}$ which is to be achieved is determined. The electromechanical actuators of the wheel brakes 5, 6 of the parking brake device 20 are then actuated in such a way that the motor vehicle actual longitudinal deceleration $a_{Fzg,ist}$ measured by means of the acceleration detection device 11 is adjusted to the determined motor vehicle setpoint longitudinal deceleration $a_{Fzg,soll}$.

The operating method according to the example for the electrical parking brakes (EPB) 5, 6 during a dynamic braking operation is suitable to be used in parallel with a front axle VA which is also braked. This permits the use of the EPBs 5, 6 in order, for example, to implement a braking operation of the rear axle HA in parallel with a hydraulically braked front axle VA.

The operating method according to the example is also suitable for electric parking brakes 5, 6 in order to assist a hydraulic braking operation which acts on both axles VA, HA (front and rear axles). This is used, for example, to assist an unboosted, driver-actuated braking operation by means of the hydraulic service brake device 10 and therefore to increase the overall braking effect with the same actuation work of the driver.

In both cases, during a dynamic braking operation a braking operation of the rear axle HA is implemented by means of the electric parking brakes 5, 6 on the basis of motor vehicle longitudinal decelerations $a_{Fzg,ist}$ and, if appropriate, motor vehicle lateral accelerations $a_{Quer,ist}$ without using wheel rotational speed information. This constitutes support or use of the electric parking brakes 5, 6 in parallel with hydraulic braking during travel.

In order to implement a braking operation of the rear axle in parallel with a hydraulically braked front axle, the operating method operates according to the example with a suitable evaluation of the longitudinal acceleration information and, if appropriate, the lateral acceleration information and suitable actuation of the EPB actuators. This advantageously permits analog and stepless generation of a rear axle braking force in proportion to the front axle braking force.

The method provides the advantage that it can be carried out with electric parking brakes which are known per se. Electromechanical EPB actuators which are known per se usually do not have a sensor system, such as for example force, travel or angle sensors, since this is sufficient for operation as an electric parking brake in a stationary state for which these actuators are designed. Use of electrical parking brake actuators during travel would require detection of the current braking force or clamping force if the braking effect is to be able to be set by means of an actuation signal in an analog (in the stepless case) and reproducible fashion. However, this is not implemented for reasons of cost. The wheel rotational speed information could be used to permit use of the EPB actuators for a dynamic braking operation during travel. However, the wheel rotational speed information is not always available, e.g. if the wheel rotational speed sensors fail or are not available in every operating situation as a result of the design of the brake system architecture or fallback level architecture. Here, the exemplary operating method for electric parking brakes can be used on the basis of acceleration information during a dynamic braking operation. This acceleration information can be obtained internally or via bus communication from the sensor system which is usually already installed or, if appropriate, additionally installed, i.e. a control unit.

An exemplary method for operating a brake system with a hydraulic service brake device 10 with hydraulically actuated wheel brakes 1, 2 at at least the front axle VA and a parking brake device 20 with wheel brakes 5, 6, which can be actuated in each case by an electromechanical actuator, at the rear axle HA is carried out as follows:

If the front axle VA is braked hydraulically by building a wheel brake pressure $p_{VA}$, initially a corresponding vehicle deceleration $a_{Fzg,ist}$ occurs. According to the example, the rear wheels HR, HL are braked in proportion to the front axle VA using the wheel brakes 5, 6 on the basis of the longitudinal acceleration information ($a_{Fzg,ist}$) and the front wheel brake pressure or pressures.

For this purpose, the corresponding vehicle deceleration $a_{VA}$ (referred to as first motor vehicle longitudinal deceleration portion) at the set front axle brake pressure $p_{VA}$ is acquired. That is to say a ("theoretical") longitudinal deceleration portion of the VA is calculated from the front axle brake pressure $p_{VA}$ using a predefined relationship, e.g. a formula.

A permissible deceleration portion $a_{HAtheo}$ of the rear axle HA (referred to as the third motor vehicle longitudinal deceleration portion) is acquired on the basis of the vehicle geometry and center of gravity which are known for the motor vehicle, including the calculated longitudinal deceleration portion $a_{VA}$ of the front axle VA. For this purpose, a formula is advantageously predefined for the deceleration portion $a_{HAtheo}$ of the rear axle HA. That is to say it is determined what braking force the rear axle HA can still apply to the underlying surface with course stability according to the dynamic axle load displacement, that is to say without a loss of stability of the vehicle.

The acquired possible deceleration portion $a_{HAtheo}$ of the rear axle HA is used, minus a safety margin $\Delta a$, as a target deceleration $a_{HA}$ for the rear axle HA (referred to as the second motor vehicle longitudinal deceleration portion).

The rear axle target deceleration $a_{HA}$ is added to the front axle deceleration portion $a_{VA}$, already acquired by means of the front axle brake pressures $p_{VA}$, ($a_{Fzg,soll}=a_{VA}+a_{HA}$). This entire vehicle target deceleration (motor vehicle setpoint longitudinal deceleration $a_{Fzg,soll}$) is now compared with the measured longitudinal acceleration of the vehicle $a_{Fzg,ist}$ and serves as a control error with respect to the actuation of the electric parking brake actuators at the rear axle HA.

For example, the rear axle braking force is then therefore increased until the measured vehicle longitudinal acceleration $a_{Fzg,ist}$ has reached the acquired vehicle target deceleration $a_{Fzg,soll}$. For this purpose, the electric parking brake actuators are correspondingly applied, and therefore increase their clamping force, until the desired vehicle target deceleration $a_{Fzg,soll}$ is reached. When the braking specification is reduced (e.g. by the driver or an autopilot), the parking brake actuators are correspondingly released again to such an extent that the desired vehicle target deceleration $a_{Fzg,soll}$ is reached.

The control error between the acquired vehicle target deceleration $a_{Fzg,soll}$ and the measured vehicle deceleration $a_{Fzg,ist}$ is therefore eliminated, according to the example, by correspondingly applying and releasing the parking brake actuators. The rear axle HA is therefore also braked in proportion to the front axle VA and instability of the vehicle is avoided by the suitably acquired rear axle target deceleration $a_{HA}$.

Since the rear axle target deceleration $a_{HA}$ has been acquired on the basis of the dynamic axle load displacement minus a safety margin $\Delta a$, the locking sequence is ensured in the case of breaking specifications which exceed the possible deceleration or braking force at the current coefficient of friction of the underlying surface, i.e. the front axle VA is locked before the rear axle HA.

In order to avoid locking of the wheels as far as possible, according to the example an attempt is further made to detect locking the wheels on the basis of the vehicle longitudinal acceleration $a_{Fzg,ist}$. For this purpose, according to the example it is observed whether the vehicle longitudinal acceleration $a_{Fzg,ist}$ does not increase further despite an increasing breaking specification, thus remains constant or even decreases again even though the brake pressure has not been reduced. This indicates locking of the wheels. After this detection, the brake pressure $p_{VA}$ is modulated in accordance with an ABS-cycle-similar pressure profile, a suitable pressure value is thus built up and after a short time a portion of the pressure value is built up again.

In order to avoid locking the wheels, e.g. a time profile or a change in the motor vehicle actual longitudinal deceleration over time and the time profile of the wheel brake pressures of the hydraulically actuated wheel brakes of the front axle VA is observed. Locking of at least one of the wheels can be inferred on the basis of the observation.

In this context, a reduction in or plateauing of the motor vehicle actual longitudinal deceleration are to be detected. As long as the brake pressure at the front wheels becomes higher, the motor vehicle actual longitudinal deceleration also increases correspondingly. If at least one of the front wheels locks, the motor vehicle actual longitudinal deceleration plateaus or drops again since locking wheels according to known coefficient of adhesion curves of tyres can transmit significantly less force after an adhesion maximum, which, depending on the tyre and the underlying surface, has an approximately 10-15% slip, is exceeded. That is to say locked wheels or wheels which have a high degree of brake slip transmit less braking force to the road than if the wheel is still in the stable slip range. Measurement variables or motor vehicle actual longitudinal deceleration measured values which are filtered to differing degrees are advantageously used for observing the motor vehicle actual longitudinal deceleration. Since a relatively strong filtering also results in a relatively large time offset of the signal, this provides the possibility that in the case of a reduction in the motor vehicle actual longitudinal deceleration an intersection point is produced between a strong signal and a less strongly filtered signal. On the basis of this intersection point between the signals and the observation of the signal profile it is possible to infer that at this moment or shortly before the front wheels have begun to lock or an excessively large slip has started.

Locking of at least one of the wheels can be detected on the basis of this observation of the specified variables. According to the example, a reduction in pressure is then carried out at the wheel brakes of the service brake device. The reduction in pressure is carried out here similar to as is customary in the case of an ABS control, with the objective of ensuring that the wheels return to a stable slip range, and therefore, on the one hand, can output more longitudinal force again and furthermore can also transmit lateral guidance force again. Higher deceleration can therefore be achieved and the vehicle continues to be steerable.

During cornering, according to the example the target deceleration $a_{HA}$ of the rear axle HA is furthermore reduced further on the basis of the vehicle lateral acceleration $a_{Quer,ist}$ in order to obtain an increased and therefore suitable safety margin for stable lateral guidance of the rear axle HA during cornering.

Furthermore, according to the example stability monitoring is carried out by using lateral acceleration information, yaw rate information and vehicle speed information. For this purpose, a relationship is formed between the specified information items, in order to detect an excessive change in the side slip angle of the vehicle and subsequently reduce the rear axle braking force again in favor of the lateral guidance, in order thereby to maintain the vehicle stability.

With the exemplary operating method for electric parking brakes, during a dynamic braking operation it is possible to assist or make parallel use of a hydraulic braking operation during travel on the basis of longitudinal acceleration information without using wheel rotational speed information. In this context, the vehicle stability is advantageously maintained by suitably acquiring the rear axle setpoint longitudinal deceleration or vehicle setpoint longitudinal deceleration and regulating the rear axle brake actuators (electric parking brake actuators) on the basis of the vehicle longitudinal acceleration.

The regulation according to an aspect of the invention on the basis of the vehicle longitudinal deceleration permits the braking effect of the rear wheels in proportion to the front wheels.

The invention claimed is:

1. A method for operating a brake system of a motor vehicle having a hydraulic service brake device with hydraulically actuated wheel brakes on at least one front axle of the motor vehicle, and a parking brake device with wheel brakes, which can be actuated in each case by an electromechanical actuator, on a rear axle of the motor vehicle, the method comprising:
   measuring a motor vehicle actual longitudinal deceleration, wherein during a braking operation by the hydraulic service brake device a braking operation is carried out by the parking brake device while the motor vehicle is traveling,
   determining a motor vehicle setpoint longitudinal deceleration which is to be achieved,
   actuating the electromechanical actuators of the parking brake device in such a way that the motor vehicle actual longitudinal deceleration is adjusted to the motor vehicle setpoint longitudinal deceleration;
   monitoring a first time profile representing a change in the motor vehicle actual longitudinal deceleration over time and a second time profile representing a change in a wheel brake pressure of the hydraulically actuated wheel brakes over time;
   detecting locking of at least one of the wheels on the basis of the first time profile representing the change in the motor vehicle actual longitudinal deceleration over time and on the basis of the second time profile representing the change in the wheel brake pressure of the hydraulically actuated wheel brakes over time; and
   reducing the motor vehicle setpoint longitudinal deceleration when the locking of the at least one of the wheels is detected.

2. The method as claimed in claim 1, wherein the motor vehicle setpoint longitudinal deceleration is determined on the basis of a brake pressure of the service brake device.

3. The method as claimed in claim 2, wherein the motor vehicle setpoint longitudinal deceleration is additionally determined on the basis of a measured lateral acceleration of the motor vehicle.

4. The method as claimed in claim 1, wherein the motor vehicle setpoint longitudinal deceleration is calculated from a first motor vehicle longitudinal deceleration portion, for the front axle, and a second motor vehicle longitudinal deceleration portion, for the rear axle.

5. The method as claimed in claim 4, wherein the first motor vehicle longitudinal deceleration portion is determined from a wheel brake pressure of the hydraulically actuated wheel brakes of the service brake device.

6. The method as claimed in claim 5, wherein the first motor vehicle longitudinal deceleration portion is calculated from the wheel brake pressure on the basis of a first predefined relationship.

7. The method as claimed in claim 4, wherein the second motor vehicle longitudinal deceleration portion is determined as a function of a measured lateral acceleration of the motor vehicle.

8. The method as claimed in claim 4, wherein the second motor vehicle longitudinal deceleration portion is calculated from a third motor vehicle longitudinal deceleration portion and a predefined or predetermined safety deceleration value.

9. The method as claimed in claim 8, wherein the third motor vehicle longitudinal deceleration portion is calculated from the first motor vehicle longitudinal deceleration portion on the basis of a second predefined relationship.

10. The method as claimed in claim 1, wherein a change in a side slip angle of the motor vehicle is determined on the basis of a lateral acceleration of the motor vehicle, a yaw rate of the motor vehicle and a vehicle speed, and if the determined change in the side slip angle exceeds a limiting value, a brake application force at the electromechanical actuators of the parking brake device is reduced, or the motor vehicle setpoint longitudinal deceleration, is reduced.

11. The method as claimed in claim 1, wherein the motor vehicle setpoint longitudinal deceleration is determined on the basis of a wheel brake pressure of the hydraulically actuated wheel brakes of the service brake device.

12. A brake system for a motor vehicle comprising:
   a hydraulic service brake device with hydraulically actuated wheel brakes on at least one front axle,
   a parking brake device with wheel brakes, which can each be actuated by an electromechanical actuator, at a rear axle (HA), and
   an electronic open-loop and closed-loop control unit,
   wherein the brake system comprises an acceleration-detection device which detects at least one longitudinal deceleration of the motor vehicle or receives measurement data of such an acceleration-detection device,
   wherein a method as claimed in claim 1 is carried out in the electronic open-loop and closed-loop control unit.

\* \* \* \* \*